United States Patent [19]
Orcel et al.

[11] Patent Number: 5,970,083
[45] Date of Patent: Oct. 19, 1999

[54] DEVICE FOR INJECTING NON-OXIDIZING GAS INTO A FURNACE

[75] Inventors: Gérard Orcel, Villebon sur Yvette; Jean-François Regnier, Vaucresson, both of France

[73] Assignee: Alcatel Fibres Optiques, Cedex, France

[21] Appl. No.: 08/816,678

[22] Filed: Mar. 13, 1997

[30] Foreign Application Priority Data

Mar. 14, 1996 [FR] France .................................... 96 03224

[51] Int. Cl.⁶ .................................................. H05B 6/22
[52] U.S. Cl. ........................ 373/157; 373/141; 422/248
[58] Field of Search .................................. 373/139–145, 373/151, 156, 157; 422/248, 254; 219/418–420; 432/262

[56] References Cited

U.S. PATENT DOCUMENTS

| 4,030,901 | 6/1977 | Kaiser ............................................ 65/2 |
| 4,142,063 | 2/1979 | Boniort et al. ............................ 373/140 |
| 4,174,842 | 11/1979 | Partus .......................................... 277/3 |
| 4,321,446 | 3/1982 | Ogawa et al. ............................ 373/140 |
| 4,643,890 | 2/1987 | Schramm ................................. 423/659 |
| 4,666,681 | 5/1987 | Ferrand et al. ........................... 422/248 |

FOREIGN PATENT DOCUMENTS

| 0519834A1 | 12/1992 | European Pat. Off. . |
| 2340519 | 9/1977 | France . |
| 3025680A1 | 2/1982 | Germany . |
| 3731346A1 | 3/1989 | Germany . |
| 4001462A1 | 7/1991 | Germany . |
| 57-140330 | 8/1982 | Japan . |
| 1523595 | 9/1978 | United Kingdom . |

*Primary Examiner*—Tu Ba Hoang
*Attorney, Agent, or Firm*—Sughrue, Mion, Zinn, Macpeak & Seas, PLLC

[57] ABSTRACT

Device for injecting non-oxidizing gas into a furnace with a graphite concentrator (12) as the heating element used to heat a primary preform in the enclosure of the furnace (14) and moving relative to the furnace in its axial direction, and comprising at the inlet orifice (24) and at the outlet orifice (26) of the enclosure a respective annular injector (40, 42) for injecting two conical curtains of non-oxidizing gas, the gas for each of the curtains being directed towards the apex of the cone and in the direction away from the enclosure (14) so as to prevent any entry into the enclosure of air that could cause combustion of the graphite.

8 Claims, 2 Drawing Sheets

DEVICE FOR INJECTING NON-OXIDIZING GAS INTO A FURNACE

FIELD OF THE INVENTION

The present invention concerns furnaces where the enclosure is heated by a graphite heating element such as induction furnaces including a graphite concentrator and in particular a device for injecting non-oxidizing gas into the interior of a furnace of this type.

BACKGROUND OF THE INVENTION

Induction furnaces including a graphite concentrator are used in the field of optical fibers in particular. Optical fibers are fabricated from preforms which are in the form of cylindrical rods the fabrication of which necessitates a shrinking operation. In this operation, a primary preform, which is a hollow silica rod, is heated to a high temperature in a furnace so as to be converted into a solid rod after the diameter of the preform has shrunk as a result of having been subjected to pasty fusion inside the furnace.

During an operation to shrink a primary preform, either the preform moves relative to the furnace or the furnace moves in translation relative to the preform. This translation movement is effected at speeds that can be up to 500 mm/min, which makes it difficult to control the internal atmosphere, mainly because of the effect associated with the movement of the material within the enclosure of the furnace. However, entry of air and therefore of oxygen into the enclosure, the principle consequence of which would be combustion of the graphite concentrator and reduction of the service life of the graphite concentrator, must be prevented.

One solution described in the article "R.F. Induction furnace for silica-fibre drawing" published in Electronics Letters 1976, vol. 12, is to use a continuous flow of argon in the furnace enclosure. However, this solution is used in drawing the preform into an optical fiber where the speed of movement of the fiber relative to the furnace is very low (a few mm/minute), and would not be satisfactory in the shrinking operation mentioned hereinabove.

SUMMARY OF THE INVENTION

This is why the main aim of the invention is to provide a device for injecting non-oxidizing gas into a furnace having a graphite heating element which prevents entry of air into the furnace that could cause combustion of the graphite.

The invention therefore consists in a device for injecting non-oxidizing gas into a furnace comprising a graphite heating element used to heat an elongate object part of which is in the furnace enclosure, the object and the furnace being in relative movement along the axial direction of the furnace. This device includes at the inlet orifice and at the outlet orifice two rings of conduits through which non-oxidizing gas passes, the conduits of each ring being inclined at the same angle to the axial direction of the furnace and said angle being different for the two rings of conduits, so as to inject the non-oxidizing gas in two conical shape gas curtains, the gas being directed towards the apex of the cone and in the direction away from the enclosure to prevent any entry into the enclosure of air that could cause combustion of the graphite of the heating element.

BRIEF DESCRIPTION OF THE DRAWINGS

The aims, objects and features of the invention will emerge more clearly from a reading of the following description given with reference to the accompanying drawings, in which.

DETAILED DESCRIPTION OF THE INVENTION

Figure 1:
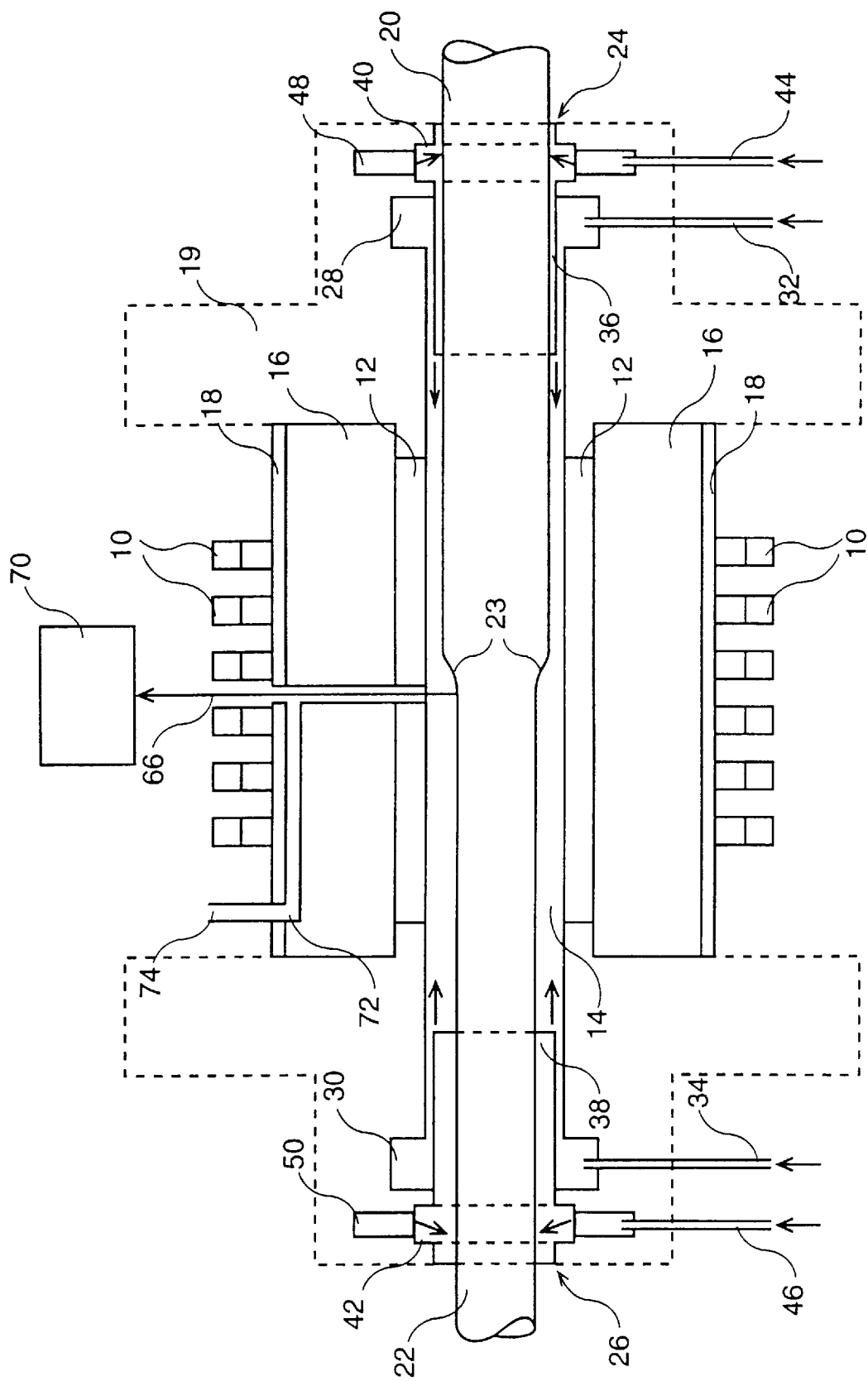
FIG. 1 is a diagrammatic sectional representation of an induction furnace including a graphite concentrator and provided with a device of the invention.

In accordance with the invention, an induction furnace as shown in FIG. 1 is a cylindrical furnace principally comprising a field coil made up of turns 10 and designed to induce an R.F. electromagnetic field and a graphite concentrator or armature 12 around the enclosure 14 of the furnace. The graphite concentrator 12 is surrounded by a thermally insulative jacket 16 generally made of graphite felt and a silica external enclosure 18. The furnace comprises other components that are not indispensable or necessary to the operation of the device of the invention, and which are included in the general enclosure 19 shown in dashed line in FIG. 1.

A furnace of this kind can be used to shrink a primary preform 20 which is in the form of a hollow rod approximately 30 mm in diameter that must be transformed into a preform 22 that can be used to draw the optical fiber, that is to say a solid rod having a diameter of approximately 20 mm. This transformation occurs principally towards the middle of the furnace, heated to a temperature of approximately 2000° C., and is manifested by the shrinkage 23.

The preform 20, 22 enters the furnace through the inlet orifice 24 and leaves through the outlet orifice 26 with a speed in translation that can be up to 500 mm/min. Alternatively the preform is immobile and the furnace moves in translation.

To prevent the combustion of the graphite concentrator 12 that would inevitably occur at the high temperature inside the enclosure 14 in the presence of air, a non-oxidizing gas is injected into the enclosure. It is injected at each orifice of the furnace, from an annular injection chamber 28 at the inlet orifice and an annular injection chamber 30 at the outlet orifice. The gas is fed into each chamber via an inlet tube 32 in the case of the injection chamber 28 and via an inlet tube 34 in the case of the injection chamber 30. Each of the injection chambers surrounds a ring having a diameter slightly less than the diameter of the enclosure of the furnace, the ring 36 in the case of the chamber 28 and the ring 38 in the case of the chamber 30, so that the non-oxidizing gas fed under pressure into the injection chamber flows in an axial direction towards the center of the enclosure (as shown by the arrows in the figure). This flow of injected gas at each end of the enclosure of the furnace therefore maintains a slightly increased pressure of non-oxidizing gas in the enclosure of the furnace to prevent any entry of air that could lead to combustion of the graphite.

However, this pressure rise inside the enclosure is not sufficient to prevent all entry of air into the enclosure, given the relative movement of the furnace and the preform. For this reason another injection chamber is provided at each end of the enclosure, namely the chamber 40 at the inlet end and the chamber 42 at the outlet end. These injection chambers, which are also annular in shape, direct towards the interior flows of pressurized non-oxidizing gas at a certain angle to the axial direction (as shown by the arrows in the figure), to create conical curtains of gas at each end of the enclosure, the apex of the cone formed by each curtain being directed towards the outside of the furnace. In tests these conical shape curtains have effectively prevented all entry of air, even if the speed of relative movement between the furnace and the preform is as high as 500 mm/min.

Figure 3:
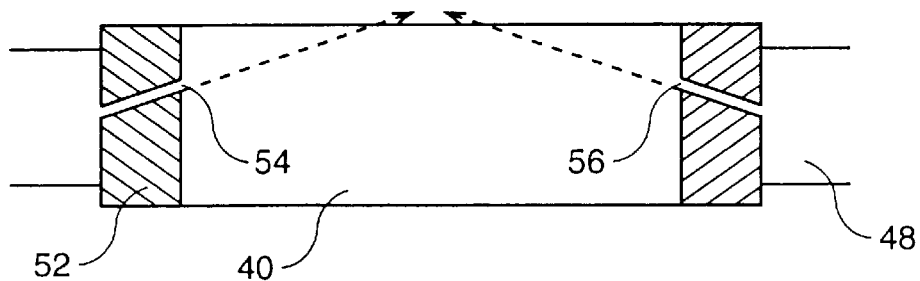
FIG. 3 is a sectional view of an injection chamber forming a curtain of non-oxidizing gas used in the device of the invention.

For the gas to be injected into the curtains at a certain pressure, the non-oxidizing gas is first fed via a tube 44 or 46 into a pressure chamber 48 or 50, also annular in shape and surrounding the injection chamber proper. As shown in FIG. 3, which illustrates the general principle with a single gas curtain, the wall 52 between the injection chamber 40 and the pressure chamber 48 is relatively thick and conduits 54 and 56 pass through it at a certain angle to the axial direction of the furnace so that the pressurized non-oxidizing gas in the pressure chamber 48 is injected into the chamber 40 at a certain speed, as shown by the arrows in the figure. The conduits through the wall being close together, a conical curtain is indeed formed inside the chamber 40, at each end of the furnace.

In practise the use of a single ring of conduits 52 as shown in FIG. 3 is not sufficient to solve the problem to which the invention is addressed. Given the relatively high speed of the gas on leaving the conduits, air molecules are entrained by the injected gas because of the viscosity of this gas when moving at high speed. When these molecules reach the apex of the cone, some of them penetrate the enclosure at the inlet orifice of the furnace (which is not necessarily always the same orifice) anyway, this being principally due to the high relative speed of translation between the preform and the furnace. For this reason it is preferable to provide two rings of conduits producing two curtains of non-oxidizing gas. Although air molecules are entrained despite the first curtain, there is a relatively low percentage of air to non-oxidizing gas between the two gas curtains, and consequently the risk of air penetrating the enclosure is absolutely negligible.

Figure 4:
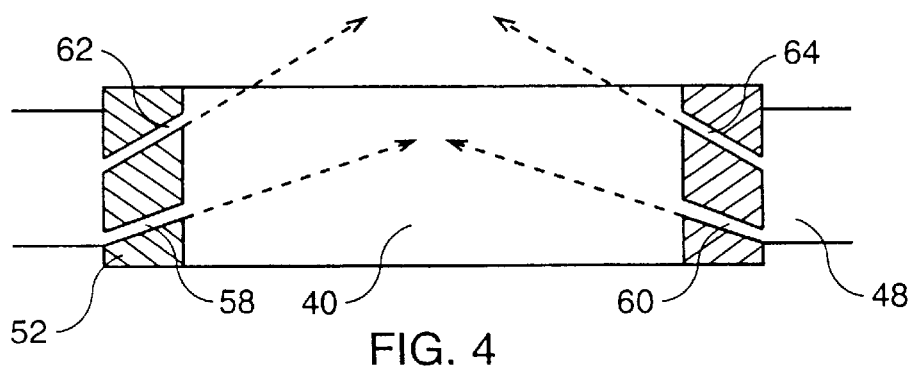
FIG. 4 is a sectional view of an injection chamber forming two curtains of non-oxidizing gas used in the device of the invention.

FIG. 4 shows the injection of a double gas curtain. In this case, the wall 52 between the injection chamber 40 and the pressure chamber 48 include two rows of conduits, a first row of conduits 58, 60 similar to the row of conduits from FIG. 3, and a second row of conduits 62, 64 with a greater inclination to the axial direction and therefore forming a conical curtain with a smaller angle at the apex than the angle of the cone formed by the first curtain. This difference between the inclinations of the two curtains makes the system more effective.

In the device shown in FIG. 4 the first row could be at an angle to the axial direction between 65° and 85° and the second row at an angle between 45° and 65°. Thus an angle of 80° can be chosen for the first row and an angle of 50° for the second row.

Figure 2:
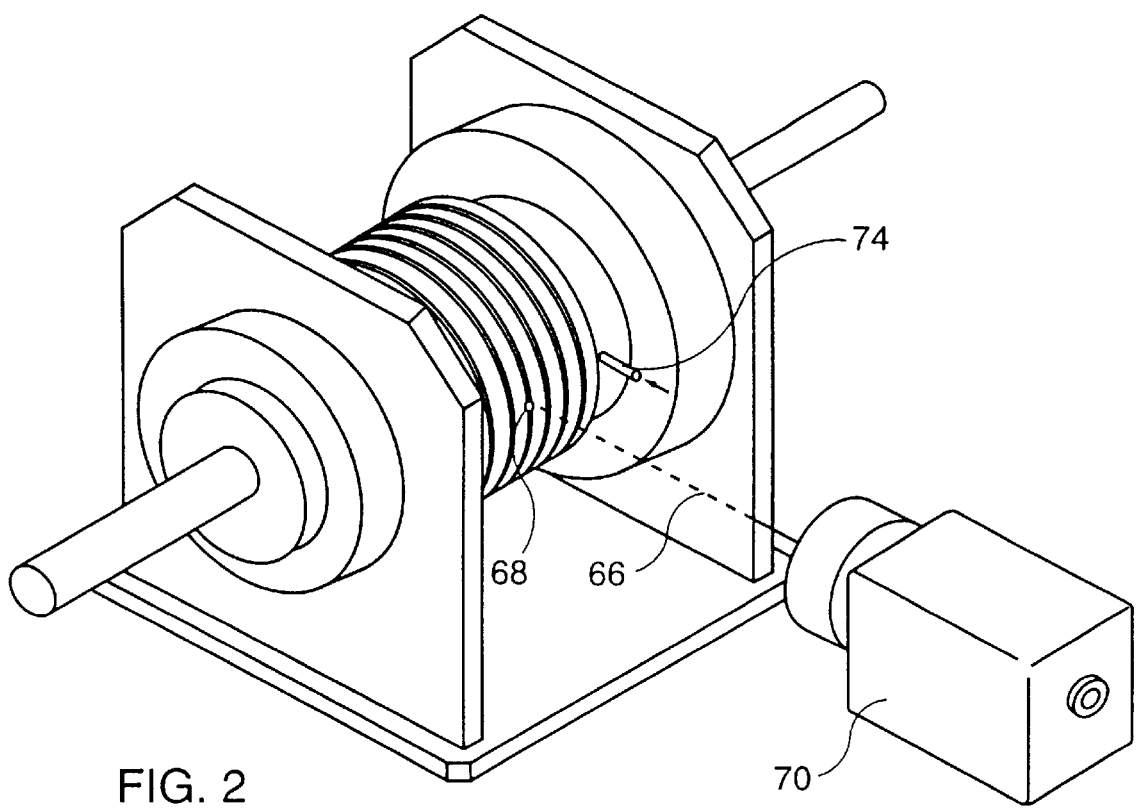
FIG. 2 is a schematic perspective representation of an induction furnace as shown in FIG. 1 and showing the pyrometer for measuring the temperature and the non-oxidizing gas access tube.

Temperature control in the furnace shown in section in FIG. 1 is improved if a pyrometer is used to take account of radiation from the preform in the enclosure. To this end, a sighting tube terminating at the location 23 where the preform is shrunk passes through the silica external enclosure 18, the graphite felt thermal insulation layer 16 and the graphite concentrator 12, leading to the core of the enclosure of the furnace without requiring a port. The radiation 66 emitted by the preform leaves the furnace via a sighting tube or orifice 68 located between two turns, as shown in FIG. 2, which represents the exterior of the furnace. This radiation is captured by a bichromatic pyrometer which is less sensitive to measurement conditions than a monochromatic pyrometer.

Although, as just described, the injection of non-oxidizing gas by the device of the invention prevents any entry of air into the enclosure of the furnace, the existence of the sighting hole 68 could allow air to penetrate the enclosure. For this reason a conduit 72 is provided into which an injector (not shown) injects non-oxidizing gas via an orifice 74 outside the turns of the field coil. The conduit 72 is in the thermal insulation layer 16 and leads into the sighting tube 68. When the non-oxidizing gas is injected into the conduit 72, some of it passes down the sighting tube 68 towards the enclosure of the furnace and thereby maintains a pressure in the sighting tube. The greater part in fact exits towards the exterior of the furnace via the orifice of the sighting tube, so preventing any entry of air into the sighting tube and thereby preventing any combustion of the graphite that could occur with the oxygen of the air.

Although this is not shown in the figure, the power of the oven can of course be slaved to the measured temperature of the enclosure.

Note that the non-oxidizing gas which is injected either into the injection chambers at the ends of the furnace or into the conduit leading to the pyrometer sighting tube can be an inert gas such as argon or helium or a reducing gas such as nitrogen.

Although the embodiment of the invention that has just been described uses an induction furnace to shrink a primary preform, it goes without saying that the device of the invention for injecting non-oxidizing gas into a furnace can be used in any other type of furnace where the enclosure has graphite walls or walls of any other material that can be oxidized and in an application to any object, not just a preform, where the object moves relative to the furnace.

We claim:

1. A high temperature induction furnace comprising a graphite concentrator heating element (12) surrounding a cylindrical enclosure (14) which has an inlet orifice (24) and an outlet orifice (26) at opposite ends thereof, an elongate object disposed in said enclosure between the inlet orifice and the outlet orifice, said object being movable along an axial direction of the enclosure, and a device for injecting non-oxidizing gas into said enclosure, wherein said device comprises two rings of conduits (58, 60 and 62, 64) through which non-oxidizing gas passes, said rings being individually disposed at said opposite ends, the conduits of each ring being inclined at the same angle to the axial direction and said angle being different for the two rings of conduits, so as to inject the non-oxidizing gas into two conical shape gas curtains, the gas being directed towards an apex of a cone defined by each of said gas curtains and in the direction away from said enclosure to prevent any entry into said enclosure of air that could cause combustion of the graphite concentrator heating element.

2. A furnace according to claim 1 including, at the inlet orifice (24) and at the outlet orifice (26) of said enclosure (14) a respective pressure chamber (48 or 50) into which the non-oxidizing gas is fed by means of a gas feed tube (44 or 46) and an injection chamber (40 or 42) separated from said pressure chamber by a wall incorporating said rings of conduits (58, 60 and 62, 64) through which the gas passes.

3. A furnace according to claim 1 further comprising a second annular injector (28, 30) at each orifice of the furnace receiving the non-oxidizing gas through a gas feed tube (32, 34) and surrounding a ring (36, 38) for injecting the non-oxidizing gas in the axial direction of the enclosure and towards the center of the enclosure so as to create a pressure increase inside the enclosure preventing all entry of air.

4. A furnace according to claim 1 further comprising a temperature measuring device which comprises a sighting tube (68) accessible from the outside of the furnace and passing through a thermal insulation jacket of the furnace (16) and said graphite concentrator heating element (12), a pyrometer (70) outside the furnace at an inlet of said sighting tube to collect radiation (66) emitted by said object approximately at a location (23) at which shrinking occurs and thereby measure its temperature, and a gas injector for injecting the non-oxidizing gas into a conduit (72) leading into said sighting tube so that the non-oxidizing gas injected flows through said sighting tube and prevents any entry of air into said sighting tube.

5. A furnace according to claim 1 further comprising a field coil (10) with turns wherein said coil and said graphite concentrator heating element (12) constitute heating means.

6. A furnace according to claim 5 wherein said elongate object heated in the enclosure of the furnace is a primary preform undergoing shrinking.

7. A furnace according to claim 6 wherein further comprises a sighting tube (68) has its end inside the enclosure approximately at the center of the enclosure to collect radiation (66) emitted at the location (23) of the primary preform undergoing shrinking.

8. A furnace according to claim 1 wherein said non-oxidizing gas is argon.

* * * * *